Figure 1:
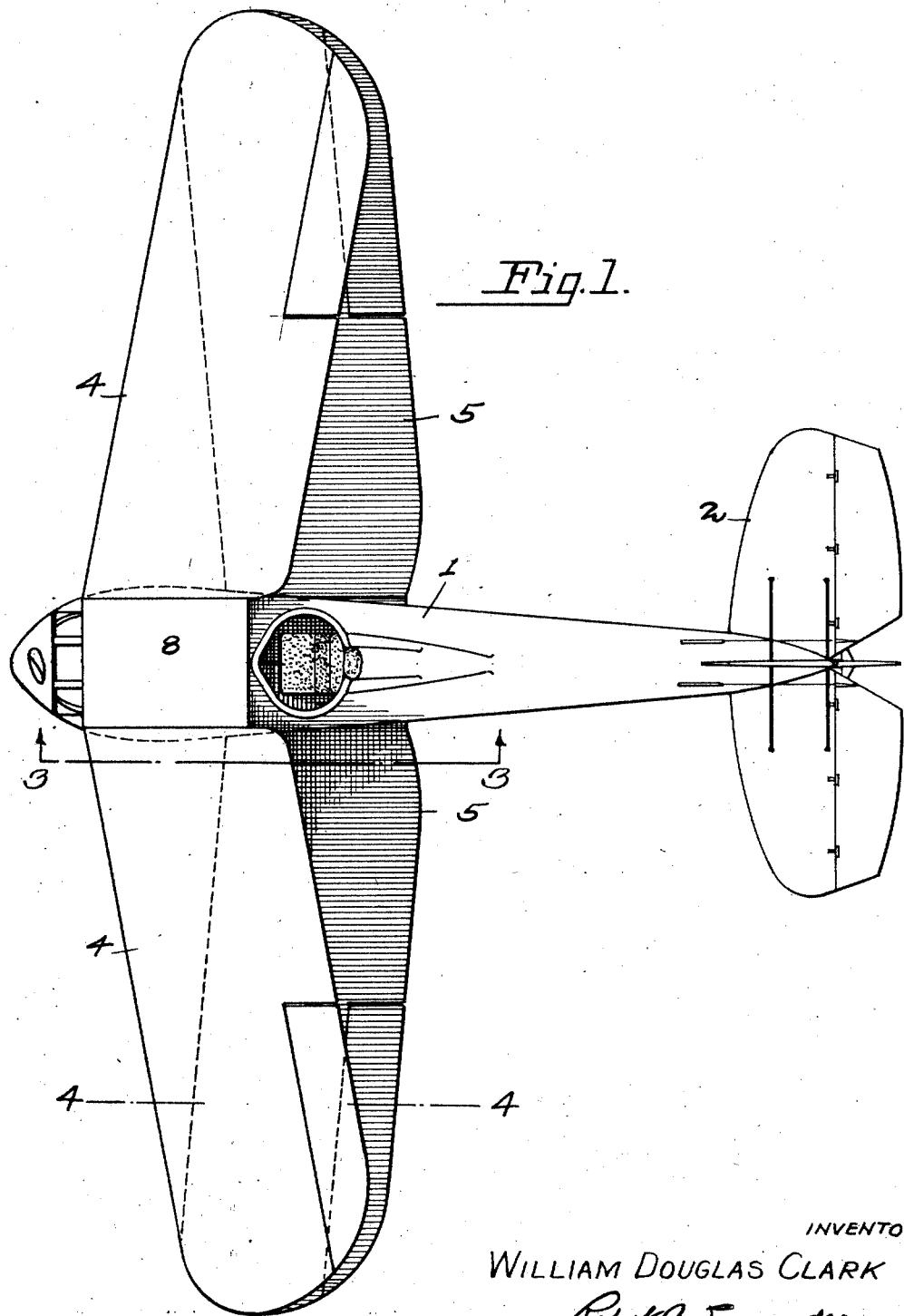

Aug. 6, 1929.  W. D. CLARK  1,723,678
AIRPLANE
Filed Aug. 20, 1926  3 Sheets-Sheet 1

INVENTOR
WILLIAM DOUGLAS CLARK
BY *Robert A. Lavender*
ATTORNEY

Aug. 6, 1929.  W. D. CLARK  1,723,678
AIRPLANE
Filed Aug. 20, 1926  3 Sheets-Sheet 3

INVENTOR
WILLIAM DOUGLAS CLARK
BY  ATTORNEY

Patented Aug. 6, 1929.

1,723,678

UNITED STATES PATENT OFFICE.

WILLIAM DOUGLAS CLARK, OF WASHINGTON, DISTRICT OF COLUMBIA.

AIRPLANE.

Application filed August 20, 1926. Serial No. 130,467.

My invention relates broadly to airplanes and more particularly to the arrangement of a rigid biplane wing structure having a positive stagger inboard and superimposed wing tips.

The principal object of my invention is to provide a rigid biplane wing structure so arranged as to improve the vision of the pilot, and at the same time to incorporate within the structure the most desirable aerodynamic characteristics.

Another object of my invention is to provide a rigid biplane wing structure having a relatively large stagger of the wings inboard, and relatively small stagger at the interplane struts and practically no stagger at the wing tips.

A further object of my invention is to provide a wing structure of the character described that will give the minimum net stagger, and, in addition to increasing the angles of vision of the pilot, will possess the desired aerodynamic effect of a wing tapered in plan.

Another object of my invention is to provide a wing structure of the character described, that will include the desired gap-to-chord ratio and reduce the angularity of the interplane structure, thereby reducing the stresses imposed by the tendency of staggered wing tips to twist longitudinally when subjected to air loads.

Further objects of my invention will appear more fully hereinafter.

My invention consists in the construction, combination, and arrangement of parts as will be more fully hereinafter described and pointed out in the appended claims.

It has been found that the vision of the pilot of an airplane is improved if stagger is incorporated in the arrangement of the wing struts. It has been found, however, that when stagger is incorporated sufficient to increase materially the vision of the pilot, the longitudinal stiffness of the plane is increased to such an extent that the airplane is sluggish in its maneuvering ability and a considerable increase in effort on the controls is required.

It has also been found that when the wings of an airplane are staggered there is a tendency for the wing tips to twist longitudinally when subjected to air loads.

Tests have shown that a wing tip tapered in plan improves the lateral or aileron control, but tapered wings are expensive to build due to the large number of jigs that are necessary for their construction, for all ribs and fittings are of different dimensions throughout.

To eliminate the disadvantages set forth herein, I have conceived the arrangement of incorporating stagger at the center line or inboard ends of the wing of an airplane and drawing together the wing tips, that is, supperimpose the wings at the tips in plan.

When a positive stagger is incorporated inboard, a further improvement in range of vision of the operator may be had by locating the center portion or panel of the upper wing approximately at the level of the pilot's eye. A still further range of vision may be obtained by introducing a positive dihedral in the upper wings of an amount sufficient to give the required gap-to-chord ratio without disturbing the vertical location of the center panel. The upper wings in this arrangement will then sweep upwardly and to the rear, and in effect superimpose the wing tips in plan.

In any airplane design it is essential that the center of gravity of the whole plane be definitely located in respect to some given percentage of the mean aerodynamic wing chord in order to obtain the proper balance and controllability. This balance in a biplane is more easily obtained if a stagger is incorporated and the position of the wing attachment at the fuselage or body definitely fixed upon to give the best range of visibility. The wings can then be swept so that the tips are in effect superimposed, and the angle of sweep in upper and lower wings respectively be such as to give the desired relation of the center of pressure of the mean aerodynamic chord to the center of gravity of the whole. By the incorporation of this arrangement, a wide range of latitude is given the designer in obtaining balance.

Reference is to be had to the accompanying drawings forming part of this specification, in which like reference characters indicate corresponding parts throughout the several views, and in which:

Figure 1 is a plan view of an aircraft of the biplane type, having incorporated therein the combined features of my invention.

Figure 2:
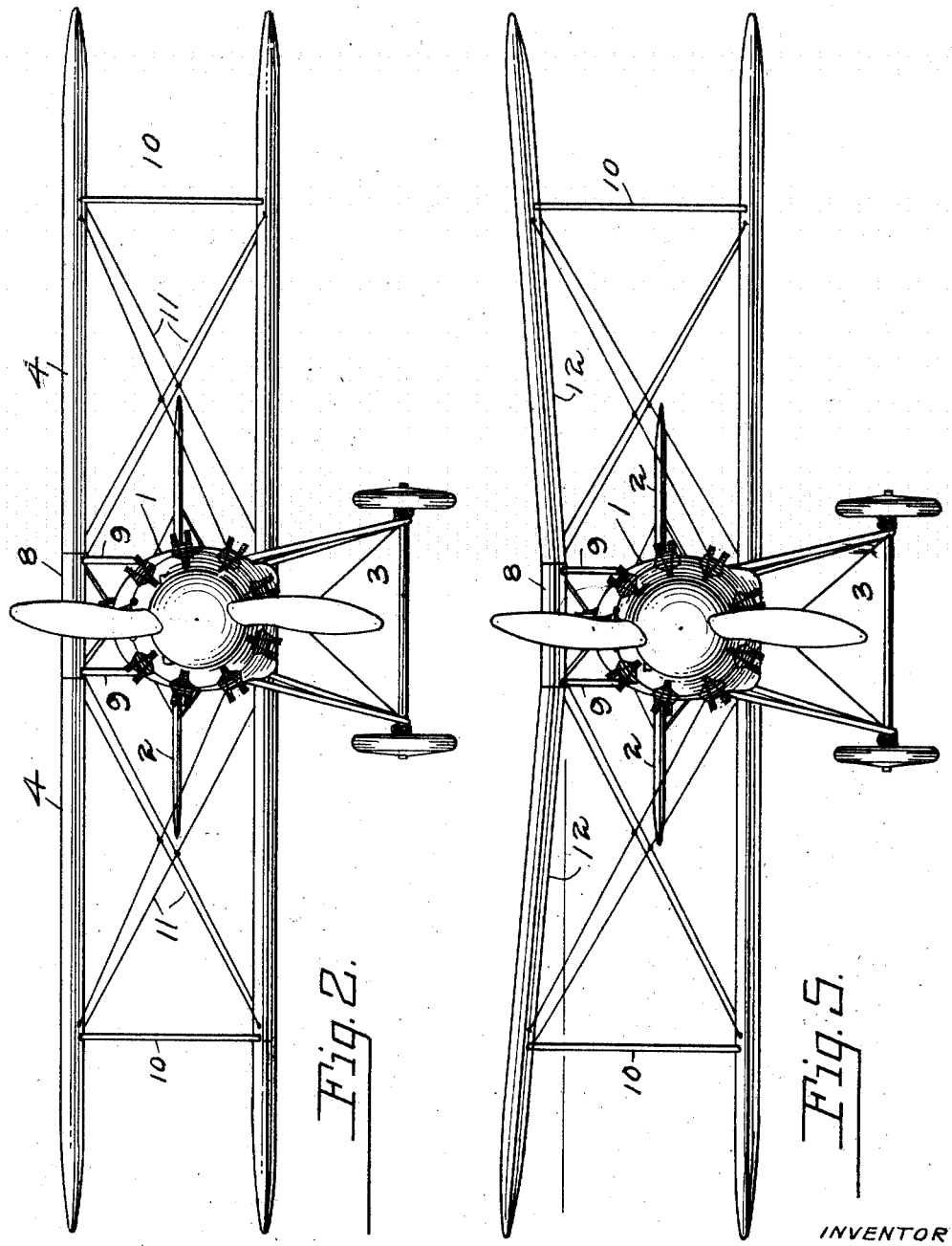
Figure 3:
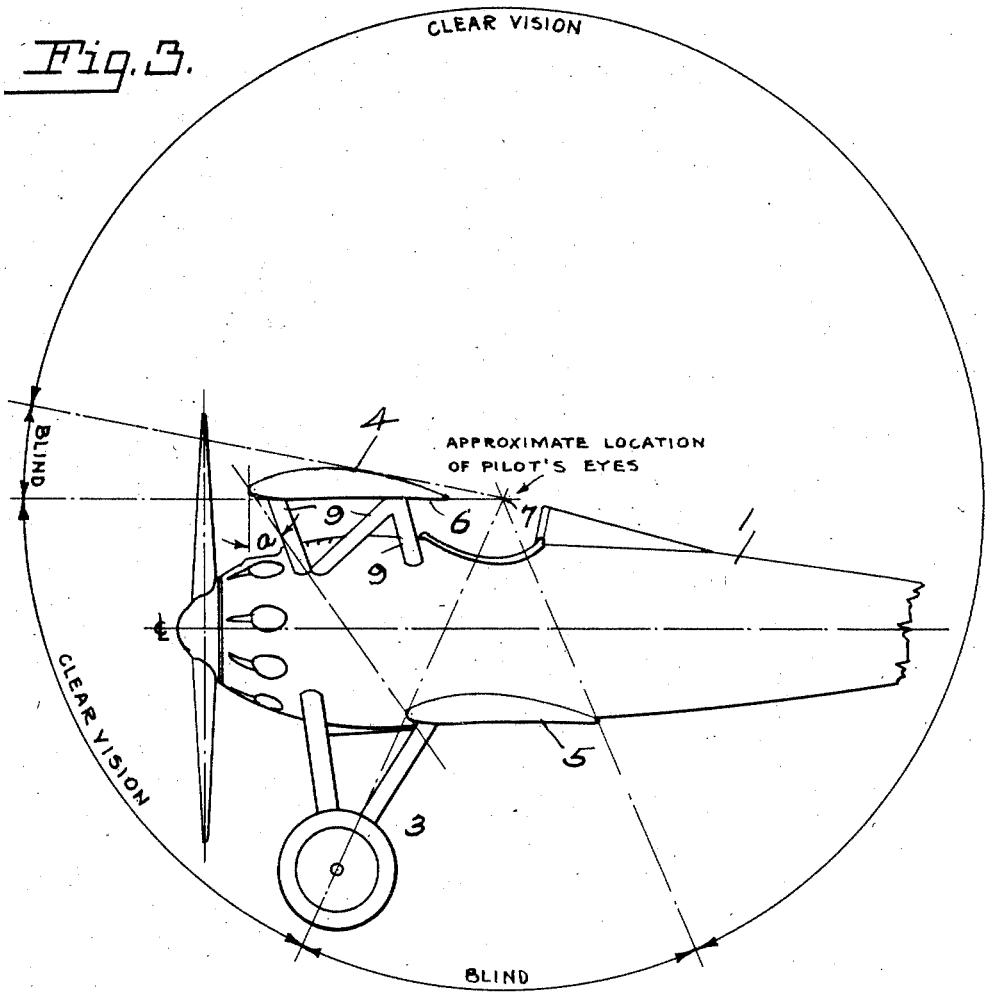
Figure 4:
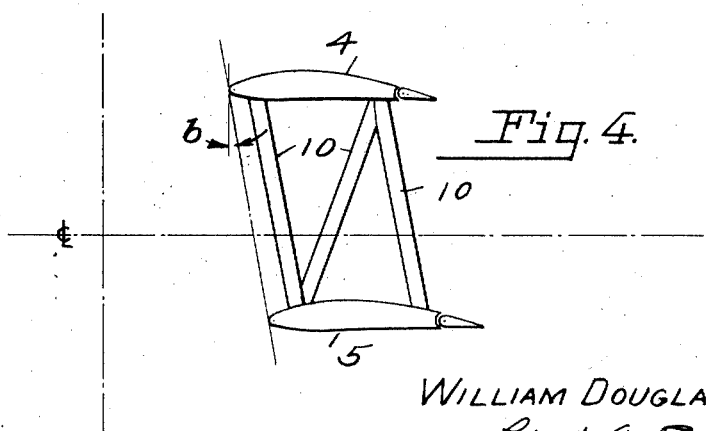

Figure 2 is a front view of a preferred form showing both upper and lower wings in parallel and no dihedral in the wings, Figure 3 is an enlarged detail sectional view taken on the line 3—3 of Figure 1 showing the amount of stagger of the wings at their root, and the consequent large range of vision thereby obtained, Figure 4 is an enlarged detail sectional view on the line 4—4 of Figure 1 showing the relatively small amount of stagger, and Figure 5 is a front view of a slightly modified form of my invention, showing a dihedral in the upper wings, in order to permit a low vertical position of the center panel and still maintain a large gap-to-chord ratio.

In the preferred form of this invention, I have shown an aircraft of the biplane type having a body 1, a conventional tail 2, landing gear 3, and a rigid biplane wing structure comprising upper wings 4, and lower wings 5. In order to obtain the greatest range of vision, the upper wings 4 are preferably located at a point where the pilot's eye will coincide with the chord line 6 of the upper wing, as at 7, see Figure 3.

The center panel 8 of the upper wings 4 is rigidly connected to body 1 by short struts 9, while the lower wings connect direct to the structural members of the fuselage 1. The biplane wing structure is held rigid outboard by the struts 10 and the diagonal lift and drift wire bracing 11.

By comparison of the stagger (*a*), as shown on Figure 3, or inboard, and the angle (*b*) shown on Figure 4, of the interplane strut bracing the improvement in the structure will be readily seen.

In the modified form of this invention, as shown in Figure 5 I incorporate a dihedral in the upper wings 4—4, as at 12—12, in order to increase range of vision and maintain the desired gap to chord ratio. No change is made relative to the plan view since all other features of the invention remain the same in both forms.

It will be understood that the above description and accompanying drawings comprehend only the general and preferred embodiment of my invention and that minor details in construction and arrangement of parts may be made within the scope of the appended claims and without sacrificing any of the advantages of my invention.

Having thus described my invention what I claim is:

1. In an airplane, a rigid biplane wing structure in which the wings have a positive stagger at their inboard ends and superimposed tips in plan, said wing structure having swept back upper wings and swept forward lower wings, and a positive dihedral in said upper wings.

2. In an airplane, a rigid biplane wing structure in which the wings have a positive stagger at the wing roots arranged to give maximum angles of vision to the pilot, the upper wings sweeping back and upwardly and the lower wings sweeping forward whereby the wing tips are in effect superimposed in plan and with the desired gap-to-chord ratio.

3. In an airplane, a fuselage, a biplane wing structure, the upper wings being attached to the said fuselage at a point forward of the pilot's seat, the lower wings being attached to the said fuselage at a point substantially beneath the pilot's seat, the said upper wings sweeping rearward toward their tips, the said lower wings sweeping forward toward their tips, so that corresponding upper and lower wings are substantially superimposed in plan at their tips.

4. In an airplane, a fuselage, a biplane wing structure, the upper wings being attached to the said fuselage at a point forward of the pilot's seat the lower surfaces of the said upper wings being substantially on the level of the pilot's eye, the lower wings being attached to the said fuselage at a point substantially beneath the pilot's seat, the said upper wings sweeping rearward toward their tips, the said lower wings sweeping forward toward their tips, so that corresponding upper and lower wings are substantially superimposed in plan at their tips.

5. In an airplane, a fuselage, a biplane wing structure, the upper wings being attached to the said fuselage at a point forward of the pilot's seat, the lower wings being attached to the said fuselage at a point substantially beneath the pilot's seat, the said upper wings sweeping rearward toward their tips, the said lower wings sweeping forward toward their tips, so that corresponding upper and lower wings are substantially superimposed in plan at their tips, the said upper wings having a positive dihedral.

6. In an airplane, a fuselage, a biplane wing structure, the upper wings being attached to the said fuselage at a point forward of the pilot's seat the lower surfaces of the said upper wings being substantially on the level of the pilot's eye, the lower wings being attached to the said fuselage at a point substantially beneath the pilot's seat, the said upper wings sweeping rearward toward their tips, the said lower wings sweeping forward toward their tips, so that corresponding upper and lower wings are substantially superimposed in plan at their tips, the said upper wings having a positive dihedral.

WILLIAM DOUGLAS CLARK.